Feb. 28, 1928.
H. W. ROMANOFF
MILLING MACHINE FOR CUTTING GEARS
Filed Nov. 2, 1926     4 Sheets-Sheet 3
1,660,888
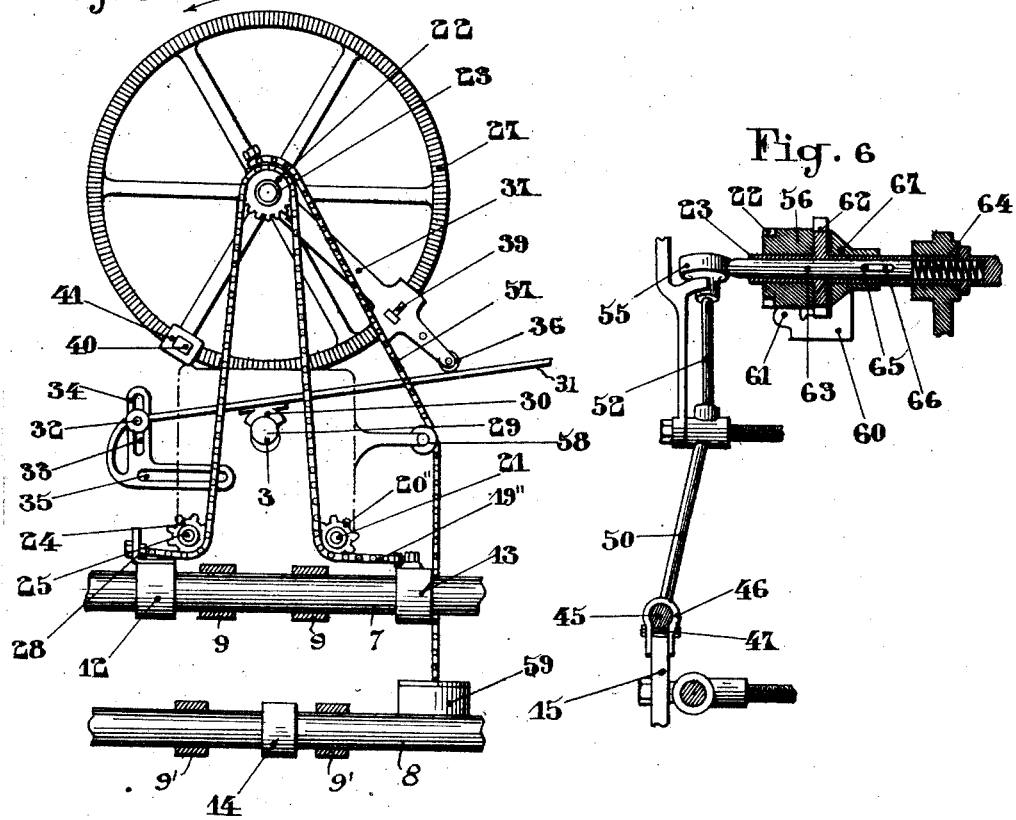
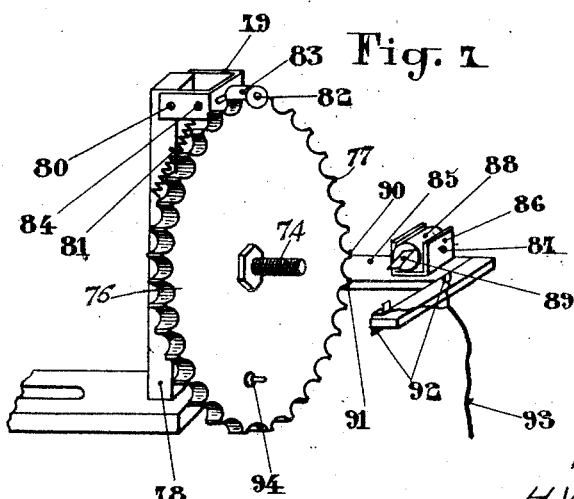
INVENTOR
H. W. Romanoff

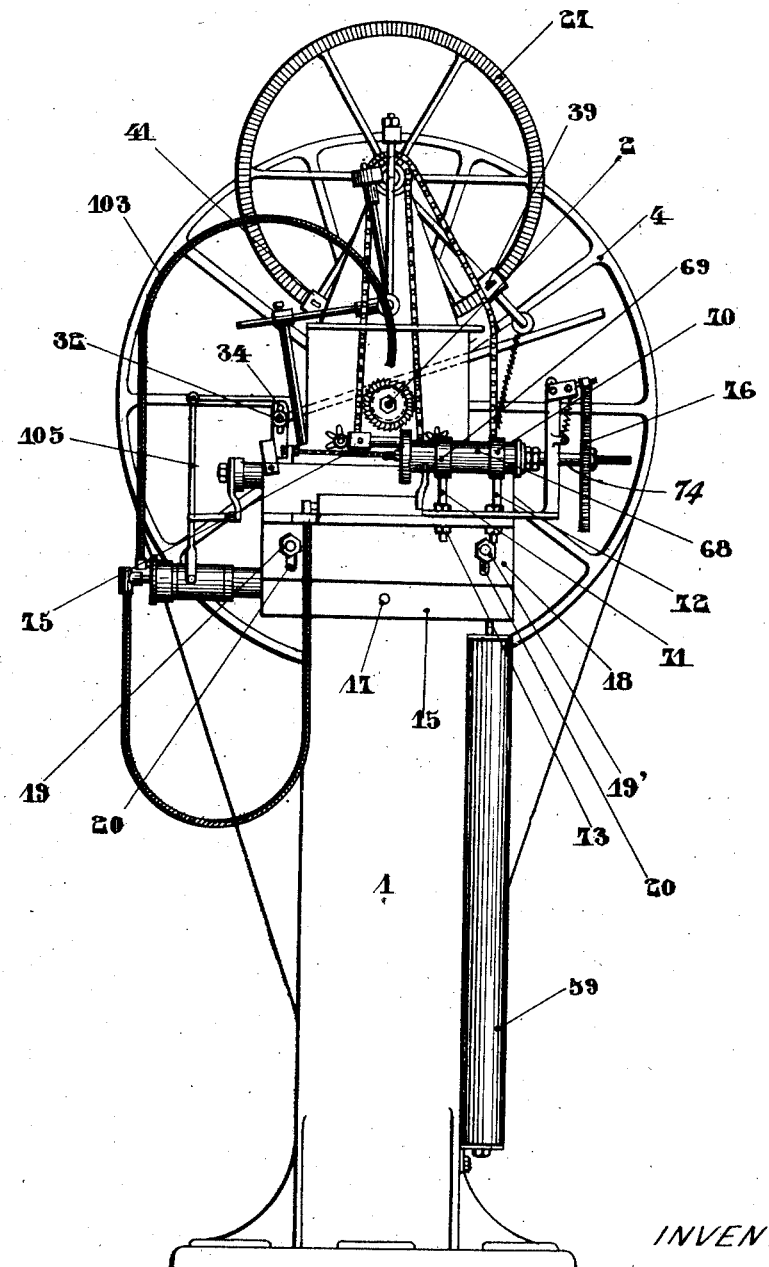

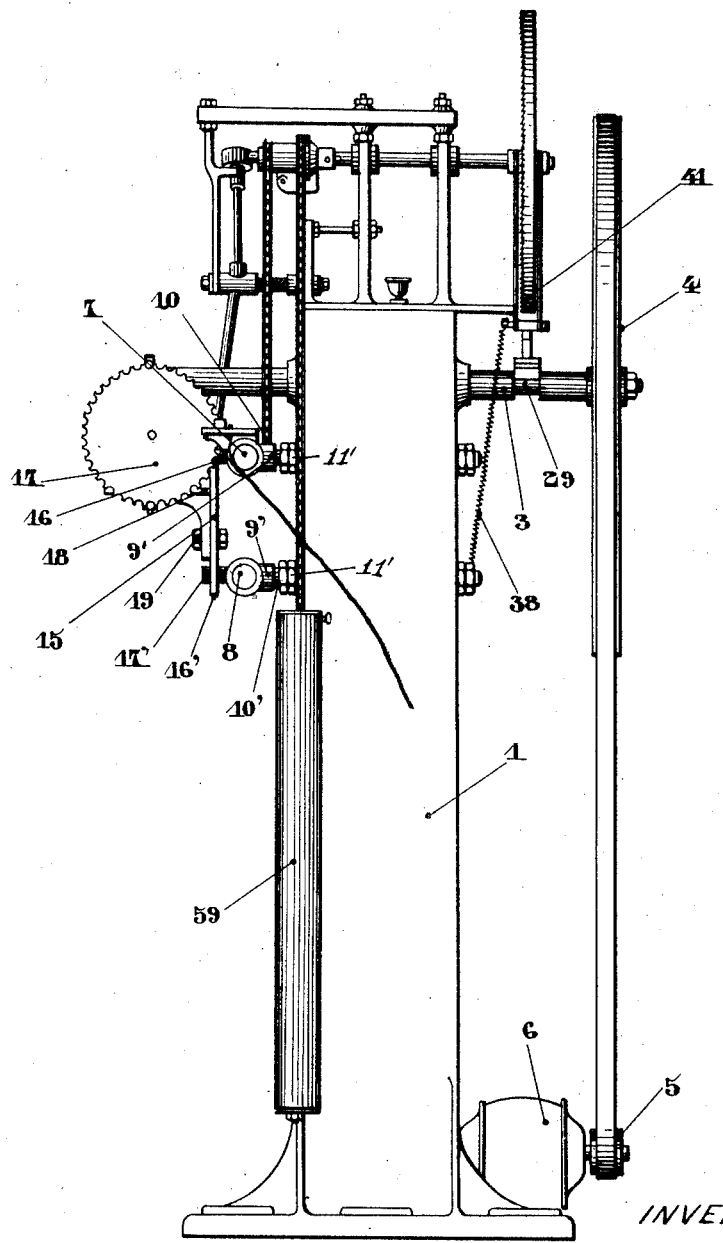

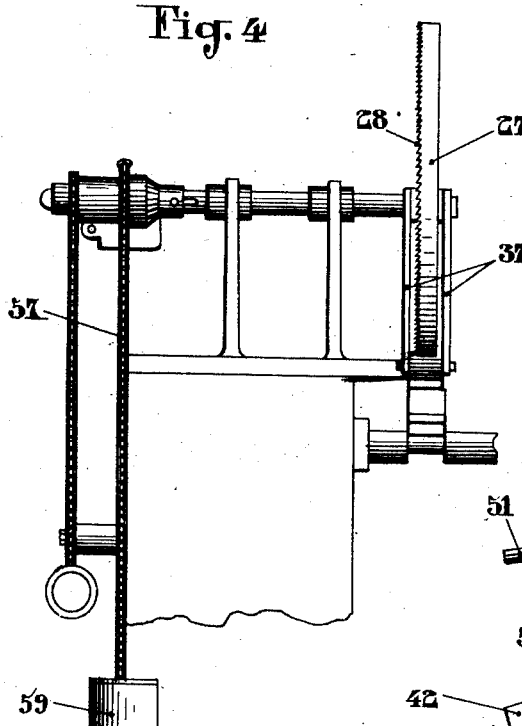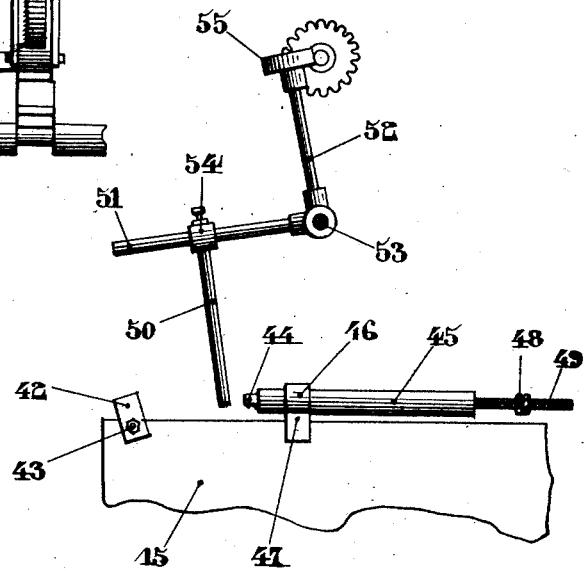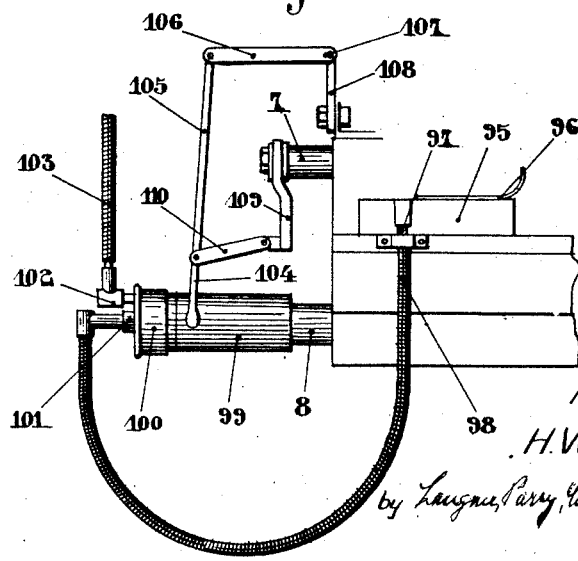

Patented Feb. 28, 1928.

1,660,888

UNITED STATES PATENT OFFICE.

HIPPOLYTE W. ROMANOFF, OF LEVALLOIS-PERRET, FRANCE.

MILLING MACHINE FOR CUTTING GEARS.

Application filed November 2, 1926, Serial No. 145,849, and in France April 16, 1926.

The subject of the invention is a milling machine for cutting spur gears, and if desired for cutting oblique gears by employing the necessary accessory members, such as are employed in ordinary machines, which machine operates automatically and presents the following advantages:

Flexibility of the forward drive of the slide carrying the piece of work, this flexibility being the result of a chain drive.

Rapid and elastic return of the slide obtained by springs the expansion of which is restrained by an oil dashpot.

Engagement and disengagement of the forward drive of the holder or slide obtained by adjustable stops producing the automatic action.

Easy adjustment of the forward speed of travel of the slide without changing pulleys or gears.

Rotation of the work carrying spindle, obtained after each tooth has been cut, by an automatic device adapted to the pitch of the gear to be cut.

Oil pump controlled by the movements of the slide and limiting the supply of liquid to the tool to the working period.

Automatic stop controlling an electric bell mechanism which operates to give a warning that the work has been completed.

In the accompanying drawings, Figure 1 is an elevation of the machine which forms the subject of the invention.

Figure 2 shows the same machine in side elevation.

Figure 3 is a view in elevation, to a larger scale, of the devices controlling the forward and return motions of the slide.

Figure 4 is a side view of the same devices.

Figure 5 is a view in elevation of the system of automatic engaging and disengaging means.

Figure 6 shows the same means in side view with a part in elevation and a part in section.

Figure 7 is a perspective view of the device producing the rotation of the work carrying spindle, also showing the electrical stop device which warns the operator that the work has been completed.

Figure 8 is an elevation of the oil pump.

As shown in Figures 1 and 2 the arrangement of members forming the machine is carried upon a frame or bed 1 which may be of any suitable shape and dimensions according to the type of machine considered.

The milling cutter 2 is mounted in any suitable manner upon a shaft 3 driven by a pulley 4 keyed upon it; this pulley 4 is driven, through the medium of a belt, either from the pulley 5 of an electric motor 6 or from an adjacent driving shaft.

According to the ratio of the diameters of the pulleys 4 and 5 the milling cutter 2 is given a movement of rotation at constant angular velocity, its plane of rotation remaining fixed.

Upon the front face of the machine two slide bars 7 and 8 which may be solid or hollow, are mounted horizontally upon the bed by means of four collars 9—9' secured to these slide bars and extended to form screwthreaded rods 10—10' enabling them to be secured to the bed by means of nuts 11—11' or by any other suitable means.

Upon the slide bar 7 are adapted to move two slide pieces 12 and 13 (see Fig. 3) and upon the slide bar 8 a slide piece 14 is adapted to move.

These slide pieces or sliders are secured to a plate 15 forming the body of the slide and they are fixed upon this plate by screwthreaded rods 16—16' and nuts 17.

Upon the plate 15 is placed an angle plate 18 secured by means of bolts 19—19' which are adapted to move in narrow slots 20—20' enabling the height of the horizontal plate of the angle plate 18 to be adjusted.

The slide 15 can therefore move horizontally over a distance determined by the distance between the collars 9 and 9' upon the slide bars 7 and 8.

As shown in Figures 3 and 4, a driving chain 19 is attached at one end to the slide piece 13. This chain is guided horizontally by the pinion 20 which turns freely upon a trunnion 21 secured to the bed or frame. It then passes over a pinion 22 which may be rendered coupled to the shaft 23 by means of clutch devices described hereinafter; then it is again guided horizontally by the pinion 24 which turns freely upon the trunnion 25 secured to the frame and is attached at its other end to an angle plate 26 mounted upon the slide piece 12.

Upon the shaft 23 is keyed a wheel 27 provided with teeth of suitable form 28 upon its front face. When the pinion 22 is put into engagement the rotation of this wheel then controls the movement of the slide through the medium of the chain 19.

The shaft 3 is provided, to the right of the wheel 27 with a cylindrical part 29 placed eccentrically, upon which is placed a half bearing 30 supporting a flat rail 31 the position of which relatively to the horizontal may be adjusted by the displacement of a pin 32 fixed in an eye or slot formed in the end of the rail 31, which pin may be fixed in any desired position in a vertical slot 33.

The member 34 in which is formed the slot 33 is also adapted to move relatively to the bed, a slot 35 enabling the position to be varied. Upon the rail 31 runs a roller 36 turning freely upon a fixed spindle mounted at the end of the double armed lever 37 pivotally mounted upon the shaft 23.

The roller 36 is constantly pressed upon its track by a spring 38 connected at one end to the spindle of the roller and at the other to the bed of the machine. The lever 37 is provided, facing the rim of the wheel 27, with a rectangular aperture in which moves a pawl or catch 39 which a spring constantly presses upon the teeth 28, only allowing the wheel to move in the direction shown by the arrow.

A second pawl or catch 40 mounted upon a member 41 secured to the bed also opposes any rotation of the wheel 27 in the opposite direction to the arrow.

When the machine is working the eccentricity of the crank pin 29 produces an oscillatory movement of the rail 31, the amplitude of which movement varies according to the inclination which has been previously given to the rail by the displacement of the pin 32 and of the member 34. It follows that the pendular movement given the lever 37 makes a larger or smaller angle according to the manner in which the adjustment of the pin 32 and of the member 34 has been carried out.

For each lift of the rail 31 the pawl 39 engaging in the teeth 28 turns the wheel 27 in the direction of the arrow, the wheel being at this moment virtually integral with the lever 37; when the rail 31 falls, the pawl following the movement of the lever returns backwards but cannot drive the wheel 27 which is then held by the pawl 40.

It will be seen that under these conditions, for one and the same speed of the main shaft upon which is mounted the milling cutter, it is possible to give the forward movement to the slide a varying speed adjusted to suit the nature of the work to be carried out.

As shown in Figures 5 and 6 the slide 15 is provided at its upper part with two stops; one 42, is rigid, in any chosen position and fixed upon the slide by a screw 43. The other stop is elastic; it is formed by a rod 44 adapted to move in a cylinder 45 by compressing a spring; the cylinder 45 is secured to the slide by means of a strap 46 the position of which may be varied and which may be rendered stationary by tightening the screw 47. The elasticity of the stop may also be adjusted by suitably varying the tension of the spring by means of the nut 48 which screws upon the screw-threaded rod 49.

Between the stops 42 and 44 oscillates a rod 50 mounted upon an angle member formed by two rods 51 and 52, which member is pivotally mounted upon a pin 53 secured to the bed. The rod 50 is adapted to move longitudinally and radially upon the rod 51 and to be fixed upon the latter in any desired position by tightening the screw 54.

The rod 52 is provided at its free end with a roller 55 which is adapted to move in front of the shaft 23. The pinion 22 upon which engages the chain controlling the forward movement of the slide is secured to a drum 56 upon which is fixed (see Figures 1, 2 and 4) one of the ends of a chain 57, guided vertically by a roller 58.

The other end of the chain 57 is secured to a piston which is adapted to move in the return cylinder 59 which is filled with a fluid, such as oil, which can only pass from one side of the piston to the other through holes, provided in a suitable number in the latter.

The winding of the chain 57 upon the drum 56 causes the piston to rise which compresses at the same time one or more springs placed between its upper face and the cover of the tube.

When the forward movement takes place, as the upward movement of the piston is slow, the oil passes easily from one side of the piston to the other but, upon disengagement, the action of the expansion of the spring is damped by the restraining effect produced by the oil in attempting to pass through the piston by means of the holes formed therein.

The arrangement formed by the pinion 22 and the drum 56 is loosely mounted upon the hollow shaft 23 which receives its movement from the wheel 27, but it may be made coupled to the shaft by means of a pawl or catch device 60 pivotally mounted upon the drum at 61 and adapted to engage with a toothed wheel 62 keyed upon the shaft 23. A spring pressing on the pawl device tends constantly to produce this engagement.

In the interior of the shaft 23 slides a cylindrical rod 63, compressing a spring 64; a pin 65 which is adapted to move in the opening 66 formed in the shaft 23 secures the rod 63 in place and a conical member 67 upon which the end of the catch 60 normally presses along a generating line of the cone.

When, as a consequence of the forward movement of the slide, the stop 44 comes into contact with the rod 50 and pushes it in the direction of movement, the roller 55 approaches more and more the rod 63 but its diameter is such that it cannot move into the position corresponding to a vertical position of the rod 52 except by pushing the rod 63 into the tube 23. This movement produces that of the member 67 of which the conical part pressing upon the end of the catch 60 causes the latter to open and release the pinion 62; at this moment the pinion 22 and the drum 56 are no longer driven by the shaft 23; the spring in the return cylinder 59, which was compressed during the forward movement of the slide, expands and brings back the slide through the medium of the chain 57 acting upon the drum 56 and consequently upon the pinion 22.

This return movement is also limited by the stop 42 when it comes into contact with the rod 50 and pushes the latter towards the right. This action has the effect of bringing the roller 55 back towards the left, which releases the rod 63 and brings the cone 67 back into its original position; the catch 60 again engages with the pinion 62 and the forward movement is taken up again.

The arrangement of these devices renders the movements of the slide automatic.

The member 18 in the form of an angle plate, which forms the plate of the slide, carries a support for the spindle upon which is mounted the piece of work. This support is formed by a cylinder 68 secured to two collars 69 and 70 which are adapted to be fixed to the plate by screwthreaded rods 71 and 72 and the nuts 73. The holes pierced in the plate, through which the screwthreaded rods 71 and 72 pass, are oval in form; this arrangement enables a vertical and lateral adjustment of the axis of the spindle to be obtained.

The spindle 74 is adapted to turn freely in the cylinder 68 which thus acts as a bearing; it is terminated forwardly by a screwthreaded rod 75 upon which is screwed a nut which enables the pieces of work to be secured in place. At its other end it is provided with a toothed disc 76 provided with a number of semi-circular notches 77 equal to the number of teeth to be formed upon the pinion to be cut.

At the end of the slide is fixed upon either side of the spindle a post 78 at the upper end of which is pivotally mounted a frame 79 pivoted on a pin 80 constantly attracted downward by a spring 81. The frame 79 is provided with a pin 82 serving as spindle for a roller 83 which engages in the notch of the wheel 76 which is opposite to it. The position of the pin 82 is transversely adjustable by means of the screw 84, and the post 78 is adapted to be moved longitudinally upon the plate of the slide in order to allow an adjustment to be made of the stops of the disc 76 in the direction of the generating line of operation of the piece of work fixed upon the spindle.

Upon the right hand end of the slide bar 7 is mounted an angle plate 85 provided with a stirrup 86 through which passes a pin 87 upon which is pivotally mounted a cylindrical member 88. The position of the pin 87 is so chosen that the member 88 can swing backwards but not forwards. The circular front face is provided with a projecting blade 89 inclined to the horizontal, to which blade any inclination may be given.

The whole of these members is so arranged that when the slide is returned the notched disc 76 recoiling one of the notches engages upon the blade 89, the upper tooth of this notch 90 encounters the blade and, the movement of recoil continuing, follow the slope formed by the blade 89, which impresses upon the disc and consequently upon the spindle a movement of rotation of amplitude equal to the pitch of the teeth. This movement compels the roller 83 to disengage from the notch in whch it is engaged and to fall back into the following notch thus bringing the piece of work into position for the following cutting stroke of the tool.

When the forward movement is again taken up the tooth 91 of the disc encounters in its turn the back face of blade 89 but the latter then offers no resistance to the passage of the tooth on account of the fact that the member 88 is adapted to swing backwards.

Upon the bent over portion of the member 85 is fixed an electric switch 92 adapted to close a circuit 93 in order to actuate a bell mechanism.

For this purpose the disc 76 is provided with a stop 94 which is placed in front of the switch at the commencement of the work. At the moment when the piece of work is finished, that is to say, when the disc has made one complete turn, the stop 94 is again opposite the switch and, as a consequence of the recoil of the slide, it presses upon one of the blades of the switch and closes the circuit. The bell mechanism then operates and warns the operator that the work has been completed.

As shown in Figure 8 the plate of the slide is provided with a trough 95 for containing the oil which has served for supplying the milling cutter during the course of the work of the latter; this trough is partly covered by a metal filter 96 for catching the filings or turnings produced by the cutting operation; near its base it is pierced with a hole 97 to which is connected at any suitable manner a flexible tube 98.

The slide bar 8 is provided at its left hand end with a sleeve 99 fitting accurately upon it and acting as a pump body; this sleeve is provided at its open end with a fluid tight cover 100 provided with two nozzles 101 and 102 the first of these nozzles being connected to the tube 98, the second to a flexible tube 103 leading over the milling cutter which is working (see Figure 1).

Upon the nozzle 101 is mounted a valve allowing the oil to pass from the tube 98 into the sleeve but preventing its return and upon the nozzle 102 is mounted a valve allowing the oil to pass from the sleeve to the tube but preventing its return.

Upon the sleeve 99 is pivotally mounted a fork 104 integral with a lever 105 the end of which is pivotally connected to a rod 106 adapted to swing upon a pin 107 secured to the member 108 fixed to the angle plate by which the chain 19 is attached upon the slide piece 12.

Upon the end of the slide bar 7 is mounted a member 109 terminating in a stirrup upon which is journalled a rod 110 which is pivotally connected at its other end, at a suitably chosen point, to the lever 105.

When the slide is drawn back the pivotal system described above produces a displacement towards the left of the sleeve 99 upon the rod 8 which acts as a piston; the oil contained in the trough 95 is thus drawn into the sleeve. On the other hand, during the forward movement the sleeve is brought back towards the right and the oil it contains is compressed and escapes towards the tool through the tube 103 during the progress of the work. It is easy to understand that this suction and delivery device limits the lubrication of the milling cutter to just the moment when the slide is moving forward, that is to say to the working period only.

It is to be understood that the milling machine as well as the various devices hereinbefore described and illustrated in the accompanying drawings only form one constructional example of the invention, which is more particularly characterized by the description made of the general nature of the devices forming the subject of the invention, which devices, combined or employed separately produce, in the operation of the machine, the advantages proper to each one of them which have been enumerated above.

These devices may naturally be combined in a different manner with regard to their respective positions upon the machine; it also goes without saying that the various members or parts with which they are formed may be made of any dimensions and of any suitable forms, may be connected to each other in any way and by any means which may be considered suitable without on that account going outside the scope of the invention.

What I claim is:

1. A milling machine for cutting gears and operating automatically comprising a work carrying slide, a work carrying spindle mounted on said slide, a rotatable shaft for producing the forward movement of said slide, a chain pinion on said shaft, a chain passing over said pinion, said pinion being adapted to be rendered fast or loose on said shaft and connected to said slide, springs returning said slide, a dashpot adapted to damp the expansion of said springs, adjustable stops, said stops being adapted to produce the engagement and disengagement of the forward movement of said slide, a pivotal system adapted to render fast or loose said chain driving pinion, said stops being adapted to control said pivotal system, a device adapted to control and regulate the forward movement of said slide, a rotatable notched disc secured to said work carrying spindle, a fixed sloping stop, said disc being adapted to encounter at the end of its said stop for one direction of its movement alone.

2. A milling machine according to claim 1, the device controlling and regulating the forward movement of said slide comprising a toothed wheel keyed on said shaft, a lever adapted to be displaced angularly, a catch on said lever, said catch being adapted to rotate said toothed wheel, an oscillating rail, a roller upon the end of said lever, said roller being adapted to run on said rail the arrangement being such that the angular displacements of said lever are controlled and can be regulated by the varying inclination given to said rail.

3. A milling machine for cutting gears and operating automatically comprising a work carrying slide, a work carrying spindle mounted on said slide, a rotatable shaft for producing the forward movement of said slide, a chain pinion on said shaft, a chain passing over said pinion said pinion being adapted to be rendered fast or loose on said shaft and connected to said slide, springs returning said slide, a dashpot adapted to damp the expansion of said springs, adjustable stops, said stops being adapted to produce the engagement and disengagement of the forward movement of said slide, a pivotal system adapted to render fast or loose said chain driving pinion, said stops being adapted to control said pivotal system, a device adapted to control and regulate the forward movement of said slide, said device comprising a toothed wheel keyed on said shaft, a lever adapted to be displaced angularly, a catch on said lever, said catch being adapted to rotate said toothed wheel, an oscillating rail, a roller upon the end of said lever, said roller being adapted to run over said rail, a rotatable notched disc secured to said work carrying spindle, a fixed sloping stop, said disc being adapted to encounter at the end of its movement said stop for one direction of its movement alone.

In testimony whereof, I have signed my name to this specification.

HIPPOLYTE W. ROMANOFF.